US008238904B2

(12) United States Patent
Muratore et al.

(10) Patent No.: US 8,238,904 B2
(45) Date of Patent: Aug. 7, 2012

(54) METHOD FOR ALLOWING ACCESS TO SERVICES OFFERED BY AN INTELLIGENT MOBILE COMMUNICATIONS NETWORK

(75) Inventors: Giuliano Muratore, Rome (IT); Pier Camillo Pelliccia, Rome (IT); Alberto Zaccagnini, Rome (IT)

(73) Assignee: Telecom Italia S.p.A., Milan (IT)

( * ) Notice: Subject to any disclaimer, the term of this patent is extended or adjusted under 35 U.S.C. 154(b) by 399 days.

(21) Appl. No.: 11/919,222

(22) PCT Filed: Apr. 26, 2005

(86) PCT No.: PCT/EP2005/004446
§ 371 (c)(1),
(2), (4) Date: Oct. 14, 2009

(87) PCT Pub. No.: WO2006/114113
PCT Pub. Date: Nov. 2, 2006

(65) Prior Publication Data
US 2010/0062762 A1    Mar. 11, 2010

(51) Int. Cl.
*H04W 92/02* (2009.01)
(52) U.S. Cl. .................................. 455/432.1; 455/433
(58) Field of Classification Search ....... 455/432.1–444, 455/515; 370/331–335
See application file for complete search history.

(56) References Cited

U.S. PATENT DOCUMENTS

| 5,701,301 | A  | * | 12/1997 | Weisser, Jr. | 370/428 |
| 5,963,630 | A  |   | 10/1999 | Dabbs et al. | |
| 6,694,153 | B1 |   | 2/2004  | Campbell et al. | |
| 6,975,852 | B1 | * | 12/2005 | Sofer et al. | 455/408 |
| 2002/0059416 | A1 | * | 5/2002 | Tuunanen | 709/223 |
| 2004/0133685 | A1 | * | 7/2004 | Jaaskela et al. | 709/227 |
| 2004/0224680 | A1 |   | 11/2004 | Jiang | |
| 2006/0025129 | A1 | * | 2/2006 | Wolfman et al. | 455/432.1 |

FOREIGN PATENT DOCUMENTS

| EP | 1 124 388 A2 | 8/2001 |
| WO | WO 00/65854 A1 | 11/2000 |
| WO | WO 03/032656 A1 | 4/2003 |
| WO | WO 03032656 A1 * | 4/2003 |

* cited by examiner

*Primary Examiner* — Ajit Patel
*Assistant Examiner* — Erica Navar
(74) *Attorney, Agent, or Firm* — Finnegan, Henderson, Farabow, Garrett & Dunner, L.L.P.

(57) ABSTRACT

A method of making network services available to a subscriber of a first mobile communications network when the subscriber roams in a second mobile communications network. The method includes: intercepting a signaling message issued by a service switching function of the second mobile communications network as a consequence to a service request by the subscriber; checking the intercepted signaling message; and based on the check, updating the intercepted signaling message so as to include service addressing data adapted to invoke a service in the first mobile communications network.

11 Claims, 5 Drawing Sheets

(1ST OF 3)

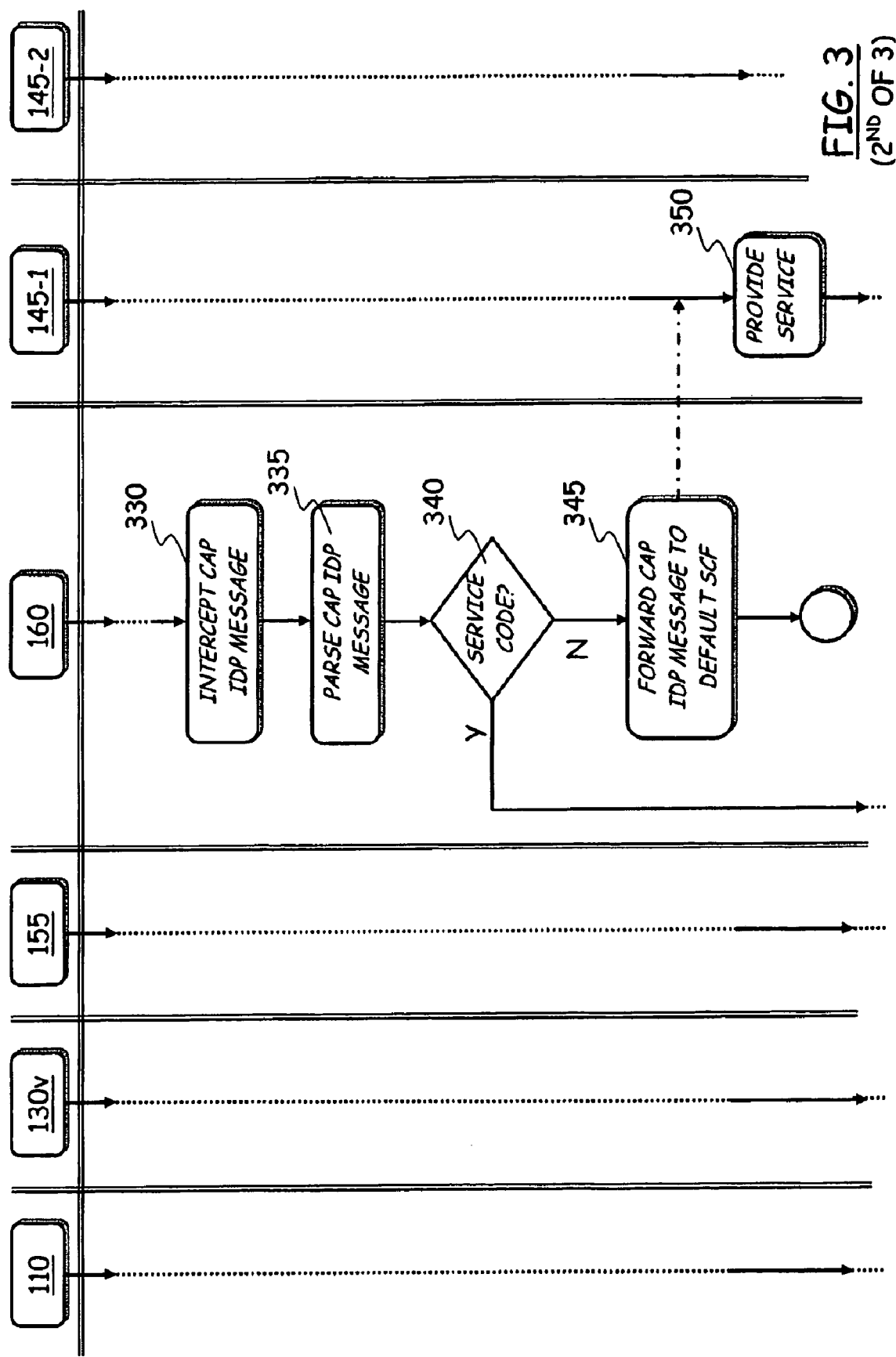

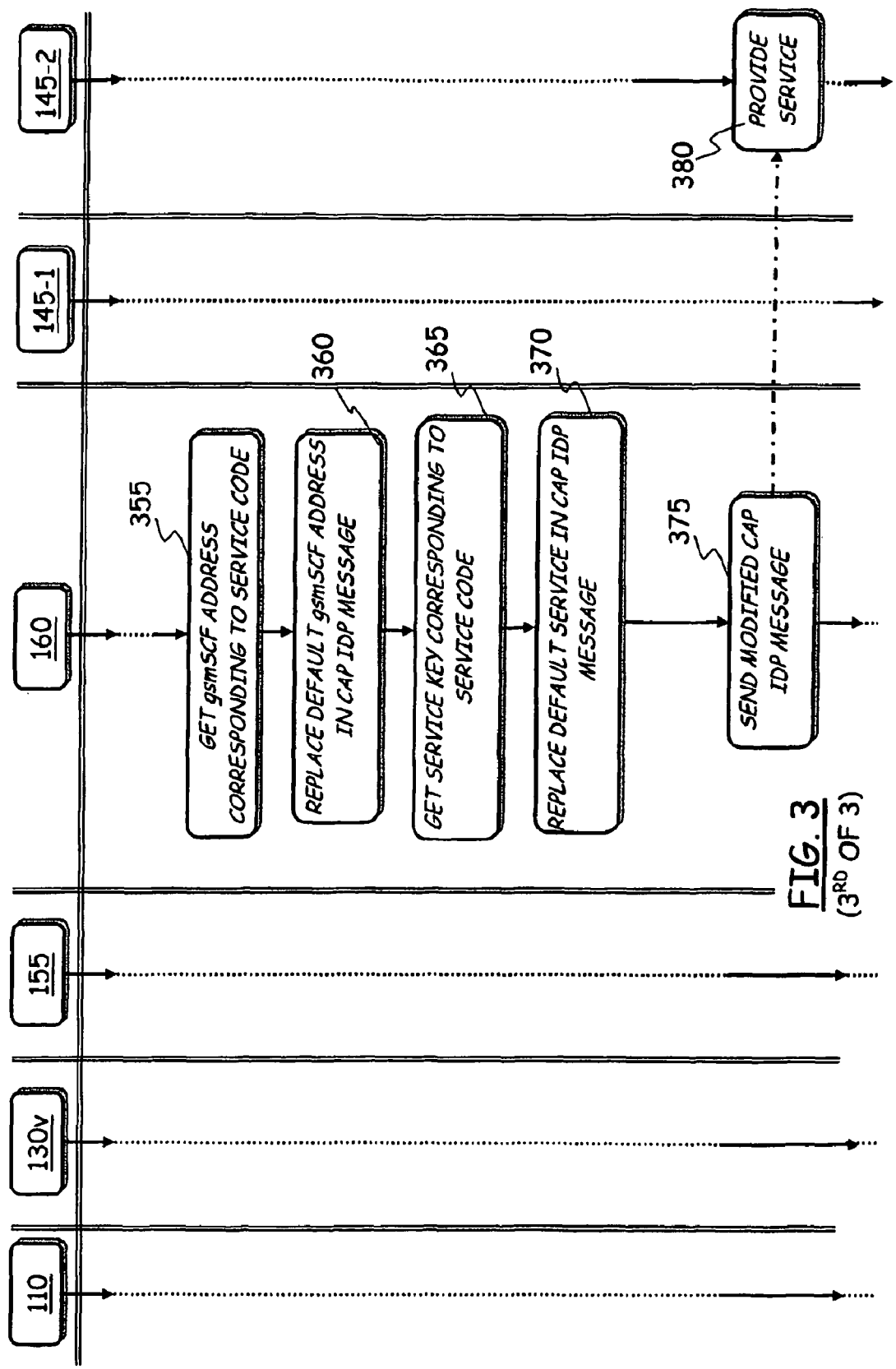

METHOD FOR ALLOWING ACCESS TO SERVICES OFFERED BY AN INTELLIGENT MOBILE COMMUNICATIONS NETWORK

CROSS REFERENCE TO RELATED APPLICATION

This application is a national phase application based on PCT/EP2005/004446, filed Apr. 26, 2005, the content of which is incorporated herein by reference.

FIELD OF THE INVENTION

The present invention generally relates to the field of mobile communications and of mobile communications networks, particularly mobile telephony networks, such as for example GSM (Global System for Mobile Communications) networks.

BACKGROUND OF THE INVENTION

In the last few years, more and more services have been made available to mobile telephony network users. In order to facilitate the addition of new services, a mobile telephony network architecture referred to as Intelligent Network (IN) has also been devised, in which the logic adapted to implement the services (so-called service logic) is separated from the switching equipment; thanks to the IN architecture, new services can be added without having to redesign the switching equipment to support those new services.

Services implemented by INs (hereinafter also referred to as IN services) include for example voice mail routing services, pre-paid telephony services, collect-call services, and Mobile Virtual Private Network (MVPN) services. Generally speaking, the IN services provide a high degree of user convenience, as they enable to perform operations such as contacting a voice mail, decreasing in real time a credit of a pre-paid account, enabling debiting the call to the called party, or dialing a number in a MVPN via a simple operation, such as dialing a short number.

A problem of IN services is that they are normally available only from a home-network to which a particular user has subscribed. When the user's terminal roams in another network, such as a network in another country or a network which is operated by another operator, the IN services usually enjoyed in the home network may not be directly available: in particular, even if the visited network is itself an IN, implementing its own services, it may happen that these services are not made available to roaming users. Even in the case the visited network offers to the roaming users IN services similar to those made available in their home network, such services may be triggered by different modalities (for example, each telephony network typically makes use of different short numbers to be dialed for accessing various IN services); ease of use of the IN services is thus jeopardized. For example, in order to contact a voice mail-box from a visited network, the user may have to dial a long number, instead of the customary short number used in the home network; similarly, in order to set up a call for a user with a pre-paid terminal, a first telephone call from the home network to the pre-paid terminal may have first to be set up, followed by a second telephone call from the home network to a destination extension.

European patent application no. EP 1124388 relates to a relay service control procedure that enables network operators and/or service providers to provide home services to the visiting user, who is located in a visited serving network, when the visited serving network is not equipped to offer the home services. This is accomplished by enabling the visited serving network to expand their portfolio of available wireless services on an as needed basis. It obtains the needed Service Logic Program (SLP) from the Service Control Function of the user's home network or the Service Control Function of any other supporting network in the wireless communication system that supports the requested service. The visited serving network executes the relayed Service Logic Program in its Service Control Function and directly controls the provision of the requested service to the visiting user.

Recently, in order to facilitate the management of IN services in cases of roaming, a standard referred to as Customized Application for Mobile network Enhanced Logic (CAMEL) has been prepared, and a phase I of the CAMEL standard is implemented in some mobile telecommunication networks at the moment.

According to the CAMEL standard, the subscription data (stored in the Home Location Register—the HLR—of the home network) of a generic user which is a subscriber of an IN includes OCSI (Original CAMEL Subscription Information) data, which are exploited when that user roams in a different network for the management of the IN services. The OCSI data include, in particular, address data of a Service Control Function (SCF) in the home network and a service key. The SCF is a network's functional entity that contains the CAMEL service logic for implementing one or more operator-specific IN services. The service key identifies the service which is intended to be made available to the user when in roaming in other networks.

Essentially, CAMEL phase I provides a standardization of messages sent from a visited network in which the terminal is present, to the home network. This standardization provides a first step towards access of IN services from another network.

PCT patent application no. WO 00/65854 relates to a method and system for distributing IN services to a mobile network, wherein a Service Trader Function (STF) is provided in the mobile network. The STF may be a function provided in the HLR or may be arranged as a separate network element connected to the HLR. The STF stores and updates locations of distributed IN services. Furthermore, an information about networks and service control points to which IN services have been downloaded may be contained in the STF. In operation, when a location update procedure is performed between the HLR and the VLR of the visited network, the subscriber's service sets are checked by the HLR. Based on the IN service information returned from the STF, the ma updates its service trigger information such as the Camel Subscription Information (CSI) in the subscriber data, and supplies it to the VLR of the visited network. Thereby, the MSC of the visited network may obtain the corresponding updated subscriber trigger information from its VLR, such that a required IN service can be executed at the visited network. The IN service may have been already downloaded to the visited network at an, earlier time, or it may be as well downloaded in the course of a triggering or location update. According to alternative embodiments, the STF may be contacted by the VLR or by the MSC of the visited network.

PCT patent application no. WO 03/032656 relates to a method for accessing an IN service implemented in a first telecommunication network by a terminal, which is subscribed to the first network and which is roaming in a second telecommunication network. The method comprises the steps initiated by a IN service request number sent from the terminal and received in a Service Switching Function (SSF) in the second network; sending an IN service request detect message from the SSF to a first Service Control Function (SCF) in the first network, based on the number; sending a redirect message from a second SCF to the SSF, the redirect message comprising a command to establish a connection and a destination number associated with the IN service to be accessed; and accessing the IN service from the SSF by dialing an access number comprising the destination number.

SUMMARY OF THE INVENTION

The Applicant has observed that the phase I of the CAMEL standard has a great limitation, because it only allows users roaming in other networks to address a single IN service logic in the home network, that is the service logic identified by the SCF address and service key specified in the OCSI data for that user. If the operator of the home network wishes to expand the range of offered services, it is necessary to redesign the service logic so as to integrate the new service(s) into the existing one(s), thereby creating a' new. IN service integrating the previously existing service and the new one(s), and addressable by the same OCSI data. The continuous redesign of the existing (and working) service logic is a drawback, since it represents a lack of flexibility and strongly slows down the implementation of new services.

A solution to this problem will be provided by the phase III of CAMEL, which will allow subscribers roaming in other networks to access their full portfolio of IN services. However, phase III of CAMEL will take several years to be widely deployed.

The Applicant has faced the problem of making IN services readily available to users even when roaming in other networks, overcoming the limitations of CAMEL phase I. More particularly, the Applicant has faced the problem of making more than one IN service available to users even when roaming in other networks, so that such services could be enjoyed also in the presently deployed networks.

The Applicant has found that the above problem can be solved by interposing an addressing function in the signaling connection originated from a Service Switching Function of a visited network as a consequence of a service request, the addressing function being adapted to update signaling messages issued by the Service Switching Function with addressing data adapted to properly invoke the service.

According to an aspect of the present invention, a method of making network services available to a subscriber of a first mobile communications network when the subscriber roams in a second mobile communications network, the method comprising:

intercepting a signaling message issued by a Service Switching Function of the second mobile communications network as a consequence to a service request by the subscriber;

checking the intercepted signaling message, and based on a result of the check, updating the intercepted signaling message so as to include service addressing data adapted to invoke a service in the first mobile communications network.

According to another aspect of the invention, a mobile communications network is provided, comprising network apparatuses adapted to make network services available to a subscriber of the mobile communications network when the subscriber roams in a visited mobile communications network, wherein the network apparatuses comprise a service addressing function including:

a signaling message interceptor adapted to intercepting a signaling message issued by a Service Switching Function of the visited mobile communications network as a consequence to a service request by the subscriber;

a signaling message parser adapted to check the intercepted signaling message; and a signaling message modifier, adapted to update the intercepted signaling message based on a result of the signaling message check, so that the updated message includes service addressing data address invoking a service in the mobile communications network.

According to a third aspect of the present invention, a mobile communications network apparatus is provided, including:

a signaling message interceptor adapted to intercepting a signaling message received by the mobile communications network from a Service Switching Function of a visited mobile communications network in which a subscriber of the mobile communications network is roaming as a consequence to a service request by the subscriber;

a signaling message parser adapted to check the intercepted signaling message; and a signaling message modifier, adapted to update the intercepted signaling message based on a result of the signaling message check, so that the updated signaling message includes service addressing data address invoking a service in the mobile communications network.

BRIEF DESCRIPTION OF THE DRAWINGS

The features and advantages of the present invention will be made clear by the following detailed description of an embodiment thereof, provided merely by way of exemplary and non-limitative example, description that will be conducted making reference to the attached drawings, wherein.

DETAILED DESCRIPTION OF THE PREFERRED EMBODIMENT

Figure 1:
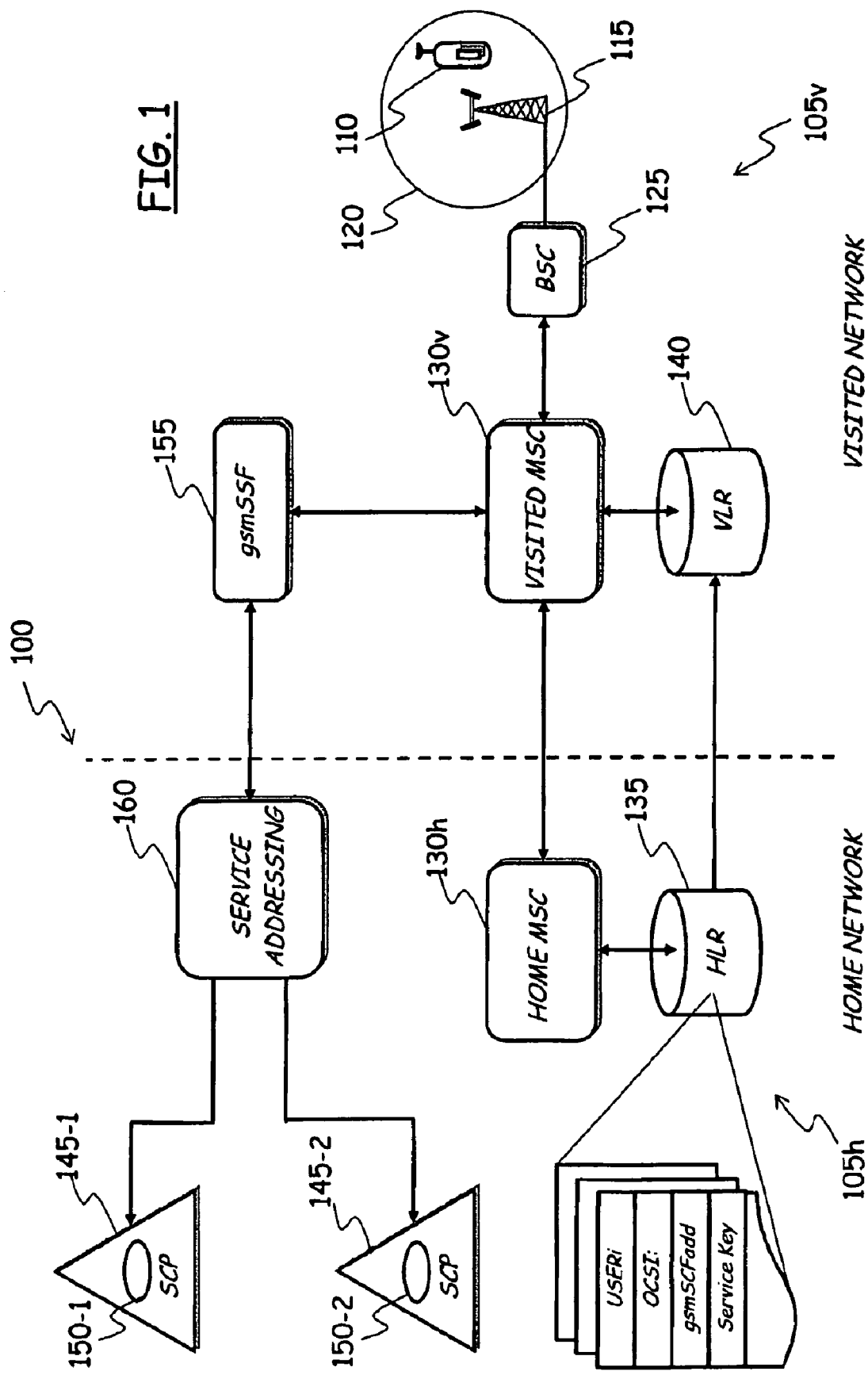
FIG. 1 schematically shows a scenario of home mobile telephony network and visited mobile telephony network, in which an embodiment of the present invention is applied.

Referring to the drawings, FIG. 1 shows, schematically and limitedly to the elements essential for the understanding of the invention embodiment being described, an infrastructure, referred to as 100, for mobile communications, particularly mobile telephony.

In particular, the mobile telephony infrastructure 100 includes a first and a second mobile telephony networks 105*h* and 105*v*; either one of the two mobile telephony network may be a second-generation cellular network, like a GSM network (or a network complying to corresponding standards in different areas of the world), or a third-generation cellular network, like a UMTS (Universal Mobile Telecommunications System) network. Either one of the first and second networks may further include, in addition to the circuit-switched network infrastructure, a packet-switched network infrastructure (e.g., a GPRS—General Packet Radio Service—or an EDGE—Enhanced Data rate for GSM Evolution), for allowing mobile users accessing packet-based communications services.

Both of the first and second mobile telephony networks 105*h* and 105*v* are assumed to include an Intelligent Network (IN) infrastructure or sub-system, for implementing and making available IN services, such as, for example, voice mail routing services, pre-paid telephony services, collect-call services, and mobile virtual private network (MVPN) services.

The first mobile telephony network 105*h* is intended to represent the home network of a user of a mobile communication terminal 110 (e.g., a mobile phone); by home network it is meant the mobile telephony network to which the user of the mobile communication terminal 110 has subscribed, and which has issued to the user a Subscriber Identification Module (SIM), associated to the mobile communication terminal 110. The second network 105*v* is intended to represent a visited network, that is, a mobile communication network having a roaming agreement with the home network 105, and in which the mobile communication terminal 110 of the user is currently registered.

In a way per-se known in the art, a mobile telephony network includes (in the exemplary case of a GSM network) a plurality of Base Station Subsystems (BSSs), each one providing coverage for mobile communications in a respective geographic region.

The generic BSS comprises a plurality of Base Transceiver Stations (BTSs), like the exemplary BTS 115 shown in FIG. 1; each BTS covers a respective area, typically referred to as a "cell", within the region covered by the BSS; in the drawing, the cell covered by the BTS 115 is schematically depicted as an encircled area denoted as 120.

The generic BTS communicates with, i.e., handles the transmission/reception of radio signals to/from the mobile communications terminals which are located in the BTS's cell; for example, the BTS 115 communicates with the mobile communications terminal 110 taken by way of example.

Typically, several BTSs are connected to and controlled by a same Base Station Controller (BSC), like the BSC 125 shown in the drawing; the BSC is a network unit that, roughly speaking, instructs the controlled BTSs about the information to be transmitted to/received from the mobile communications terminals on specified physical and/or logical radio communication channels.

Groups of different BSSs are connected to respective Mobile Switching Centers (MSCs), like the MSC 130*v* in the visited network 105*v*, and the MSC 130*h* in the home network 105*h*; the generic MSC performs the function of gateway to other MSCs of the same mobile communications network (a generic mobile telephony network may include several MSCs), and/or to the MSCs of other mobile communications networks, of different network operators, and/or to the exchanges of one or more wired, Public Switched Telephone Networks (PSTNs). For example, in the drawing the MSC 130*h* of the home network 105*h* and the MSC 130*v* of the visited network 105*v* intercommunicate with each other, thereby allowing users subscribers of the home network 105*h* to roam in the visited network 105*v*, and vice versa.

The generic MSC interacts with a network's Home Location Register (HLR), like the HLR 135 shown in the drawing in respect of the home network 105*h*, and with a local Visitor Location Register (VLR), like the VLR 140 shown in the drawing in respect of the visited network 105*v*. The generic HLR contains subscription data of users that are subscriber of a mobile communications network, particularly mobile phone numbers, users' profiles, and the like. The generic VLR contains information about the users who, at a given time, are registered to the mobile telephony network and are located in the geographic area of the respective MSC. Based on the information stored in the HLR and VLR, the generic MSC is capable of switching, i.e., properly routes calls from callers to called users.

As mentioned in the foregoing, the two networks 105*h* and 105*v* are assumed to include IN apparatuses, for implementing services to be made available to their users. Schematically depicted in the drawing are two Service Control Points (SCPs) 145-1, 145-2; a SCP is a network node that supports the implementation of the logic for one or more respective IN services, like the IN services 150-1, 150-2 pictorially shown in FIG. 1. For example, the service 150-1 may be a pre-paid call service, allowing users to make calls based on a pre-paid account, whereas the service 150-2 may be a collect-call service, allowing users to place calls and billing them to the called parties, or a MVPN service, offering to the member users a series of features such as a private numbering plan, controls on incoming/outgoing traffic, differentiated charging of calls.

As depicted schematically in FIG. 1, according to the CAMEL standard, particularly to the phase I of CAMEL, the subscription data of the generic subscriber user USERi stored in the HLR of the user's home network, in the example the HLR 135 of the network 105*h*, include OCSI data which, in turn, include an address gsmSCFaddress of a predetermined Service Control Function (SCF) in the home network 105*h*, and a key Service Key identifying a service among all the services implemented by that SCF. Summarizing, the SCF is a logic network entity that controls the implementation of one or more respective IN services, and corresponds to a SCP, which instead is a physical network node; in other words, the SCF may be seen as the function implemented by an SCP; for the purposes of the present description, SCF and SCP may be considered synonyms. The address gsmSCFaddress stored in the OCSI data of the subscriber user USERi is the address of the SCF that the operator of the home network has selected, among all the possible SCFs, for example the SCF corresponding to the SCP 145-1, for implementing at least one IN service to be made available to the subscriber user USERi when the latter roams in other networks; the key Service Key is a value identifying a service among the services implemented by the addressed SCF, for example the pre-paid call service 150-1.

Also according to the CAMEL standard, a network's logic entity called Service Switching Function or gsmSSF is provided, like the gsmSSF 155 shown in FIG. 1 in respect of the visited network 105*v*, for interfacing the network's MSCs, like the MSC 130*v*, to the selected SCF of the home network 105*h*. In particular, the gsmSSF of the visited network and the selected SCF of the home network communicate over a signaling connection (e.g. a SS7 signaling connection).

When the user USERi of the mobile communications terminal 110 roams and registers in the visited network 105*v* (e.g. he/she turns the terminal 110 on while being located in a geographic region covered by the visited network 105*v*, for example in the cell 120), at least a portion of the user's subscription data stored in the home network's HLR 135 is sent to the VLR 140 of the MSC 130*v* of the visited network under which the user's mobile terminal is located. In particular, the subscription data sent to the VLR include the user's OCSI data, i.e. the SCF address gsmSCFaddress and, the service key Service Key specified in the OCSI data for that user.

The visited network 105*v* exploits the OCSI data for determining whether the user USERi is allowed to access IN services in the home network 105*h*, and to which particular IN service the user has access.

As discussed in the foregoing, the phase I of the CAMEL standard has a great limitation, because it only allows roaming users addressing a single IN service logic in the home network, that is the service logic identified by the SCF address gsmSCFaddress and the service key Service Key specified in the OCSI data for that user. If the operator of the home network wishes to expand the range of offered services, it is necessary to redesign the service logic so as to integrate the new service(s) into the existing one(s), so as to create a new IN service integrating the previously existing service and the new one(s).

In practice, when the user, through the terminal 110, attempts to access an IN service made available by the home network 105*h* while being registered under the visited network 105*v*, for example by dialing a pre-defined short number, the request is received at the MSC 130*v* of the visited network, which, looking at the user's data in the VLR 140, finds the OCSI data and forwards the control of the request to the gsmSSF 155. The gsmSSF 155, using the SCF address specified in the gsmSCFAddress part of the OCSI data, addresses the service request to the pre-defined SCF in the home network 105*h*, for example the SCF implemented by the SCP 145-1, wherein the service specified by the Service Key part of the OCSI data, for example the pre-paid call service 150-1, is invoked. In a conventional CAMEL phase I implementation, any service request from the roaming user USERi would be addressed to the same SCF, and would cause invocation of the same service, as specified by the gsmSCFAddress part and the Service Key part of the OCSI data.

According to an embodiment of the present invention, a network entity 160 implementing an IN service addressing function is further provided in the home network 105*h*. The network entity 160 is adapted to intercept the service requests coming from the gsmSSF 155 of the visited network 105*v*, addressed to the pre-determined SCF specified in the field gsmSCFAddress of the OCSI data.

The IN service addressing function may be co-located in an already existing network node, or the IN service addressing network entity 160 may be implemented on a separate equipment. In particular, in an embodiment of the present invention, the IN service addressing network entity 160' is interposed on the signaling network, so as to interface from one side the gsmSSF 155 of the visited network 105*v*, and from the other side the SCFs of the home network 105*h* (or at least to a subset of the SCFs of the home network 105*h*).

Figure 2:
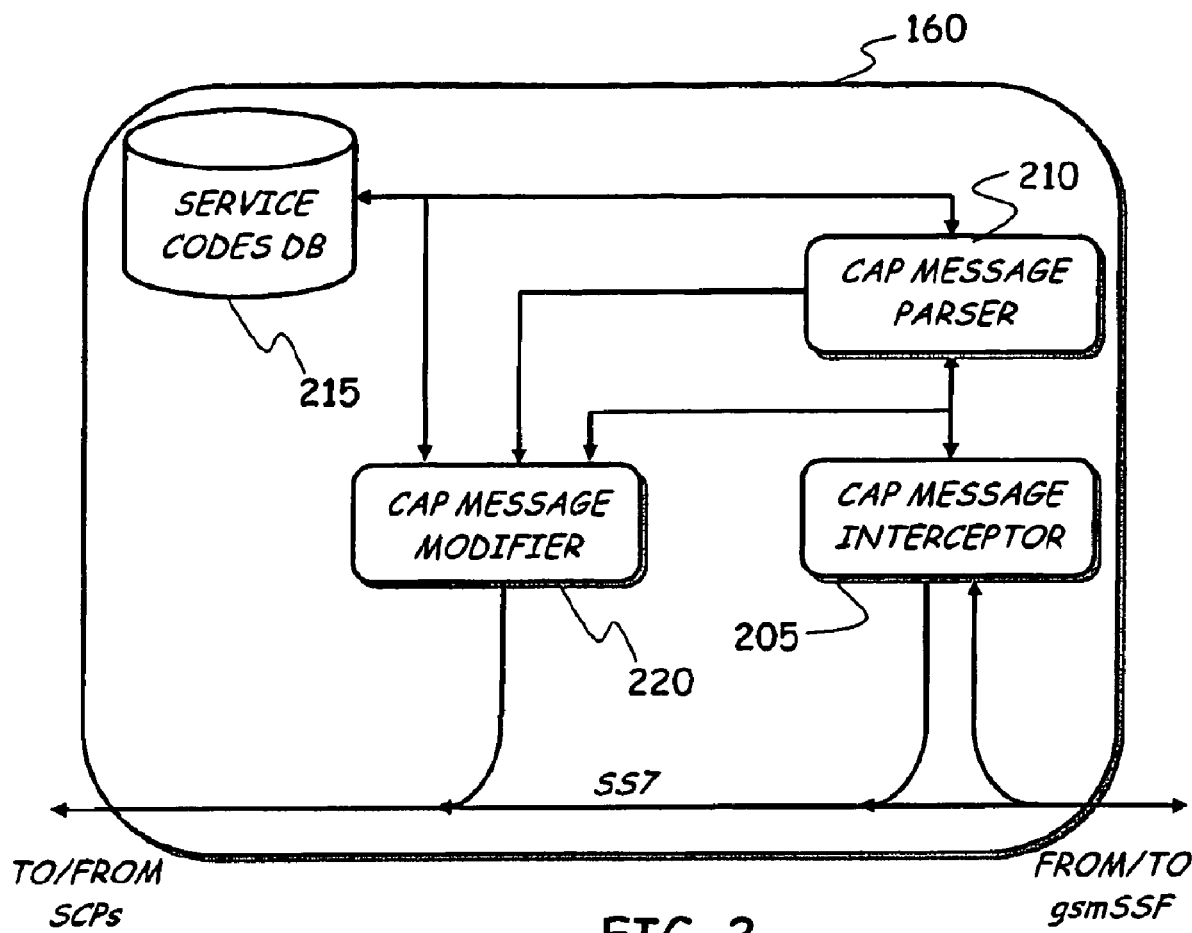
FIG. 2 is a simplified, schematic functional block diagram of a network entity, visible in FIG. 1, implementing a service addressing function, according to an embodiment of the present invention.

FIG. 2 shows in greater detail, in terms of the main functional block, the structure of the IN service addressing function 160, in an embodiment of the present invention. A CAP (CAMEL Application Protocol) message interceptor 205 is adapted to intercept CAP messages traveling over the signaling network, particularly CAP messages issued by the gsmSSF 155 of FIG. 1. The CAP message interceptor 205 forwards the intercepted CAP messages to a CAP message parser 210, adapted to parse the intercepted CAP messages, for analyzing or checking the different fields thereof; in particular, the CAP message parser 210 is adapted to check a CAP message field containing the number dialed by the user who placed the call, as will explained in greater detail later on.

The CAP message parser 210 uses, for performing the desired actions, a service codes database 215. The service codes database 215 includes a list of service codes, and, for each service code, a corresponding pair of SCF address and service key, as schematically depicted in the following table (Table I):

TABLE I

Structure of service codes database

| SERVICE CODE | SCF ADDRESS | SERVICE KEY |
|---|---|---|
| (Service Code)$_1$ | (gsmSCF)$_a$ | (Service Key)$_a$ |
| (Service Code)$_2$ | (gsmSCF)$_a$ | (Service Key)$_b$ |
| (Service Code)$_3$ | (gsmSCF)$_b$ | (Service Key)$_c$ |
| ... | ... | ... |

The SERVICE CODE field of the generic table entry contains a respective service code; a service code is for example a short sequence of numbers (like for example 4888) that the user has to dial, e.g. as a prefix added to a normal telephony number, for accessing the desired service; a generic service code corresponds to a respective IN service offered by the home network operator; the service code may be in particular the same code that the user is requested to dial when registered to the home network for invoking that service.

The SCF ADDRESS field contains the address of the SCF that, in the home network, is responsible for the implementation of the IN service identified by the respective service code; for example, the IN services identified by the service code (Service Code)$_1$ and (Service Code)$_2$ may be both implemented by the SCF having address (gsmSCF)$_a$, corresponding for example to the SCP 145-2 shown in FIG. 1, whereas the IN service identified by the service code (Service Code)$_3$ may be implemented by a SCF having address (gsmSCF)$_b$, corresponding to another SCP in the home network, possibly, the SCP 145-1 shown in FIG. 1.

The SERVICE KEY field contains a value adapted to identify the specific IN service among all the IN services implemented by the SCF whose address is specified in the SCF ADDRESS field; for example, the service identified by the user by the service code (Service Code)$_1$ corresponds to the IN service identified by the service key (Service Key)$_a$ among all the services implemented by the SCF 145-2 shown in FIG. 1.

A CAP message modifier 220 is adapted to update the intercepted CAP message, under the control of the CAP message parser 210; in order to update the CAP message, the CAP message modifier 220 exploits data stored in the service codes database 215. The CAP message modifier 220 is also adapted to send the updated CAP message over the signaling network.

Figure 3:
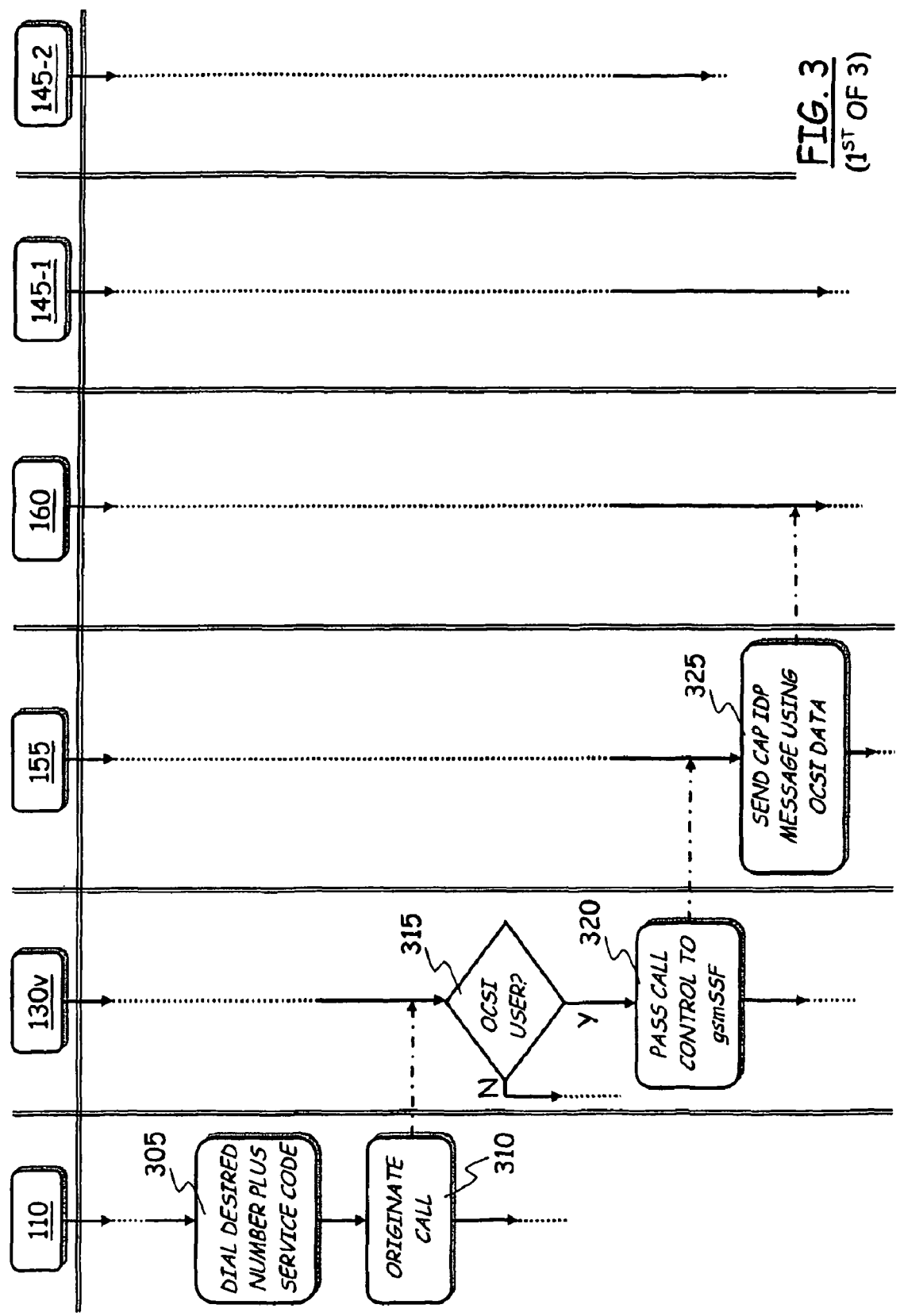
FIG. 3 is a simplified, schematic flowchart illustrating the main steps of a method according to an embodiment of the present invention.

The operation of the IN service addressing function implemented by the network entity 160 will be described in detail in the following, with the help of the schematic flowchart of FIG. 3, in an embodiment of the present invention.

The user of the mobile communications terminal 110, while roaming in the visited network 105*v*, wishes to place a call using an IN service. The user dials the desired number, e.g. the phone number of a desired interlocutor (block 305), and originates the call in the usual way (block 310).

In general, since the user is a CAMEL user, and has OCSI data associated therewith, any call originated by the user can be managed exploiting the default IN service(s) as specified in the OCSI data, the default IN service(s) being the service that is implemented by the default SCF whose address is specified in the OCSI data field gsmSCFAddress, and that is identified by the service key specified in the OCSI data field Service Key). According to an embodiment of the present invention, the user has the possibility of adding a pre-defined service code to the number dialed, for example making the service code precede, or follow the desired number to be called, so as to enjoy, for the call to be placed, of one of the IN services offered by the home network 105*h* different from the default one, for example a collect-call service or a MVPN service.

The call is received at the competent MSC 130*v* of the visited network, which, looking at the data in the VLR 140 in respect of that user, recognizes that the user is a CAMEL user (block 315) and leaves the control of the call to the gsmSSF 155 (block 320).

Figure 4:
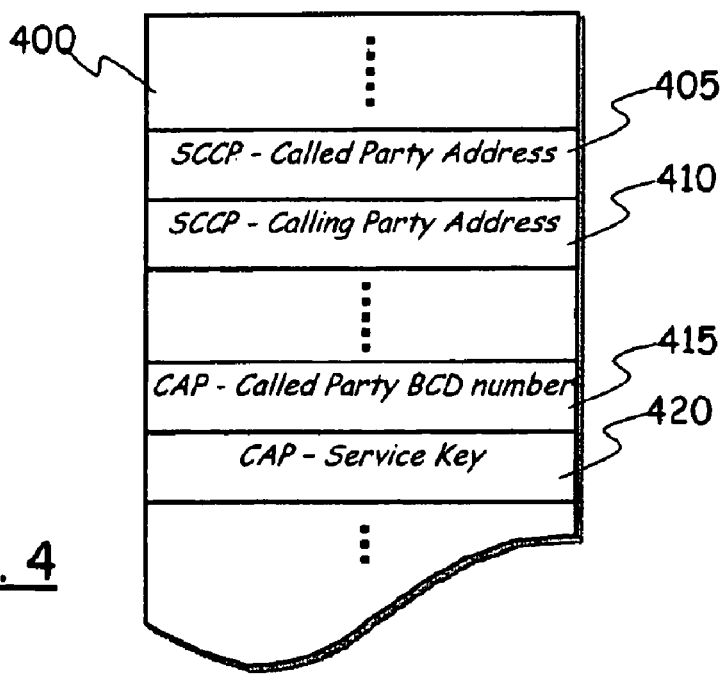
FIG. 4 is a very simplified pictorial representation of a CAP (CAMEL Application Protocol) message.

The gsmSSF 155 gets from the VLR 140 the OCSI data for that user, and compiles and sends a CAP InitialDP (IDP) message to the home network 105*h* (block 325). In FIG. 4, some fields of a CAP message 400 are schematically shown; messages according to the CAP protocol encapsulate messages according to the SCCP (Signaling Connection Control Part) protocol, which is a lower-level protocol in the protocols stack; in particular, the CAP IDP message includes an SCCP—Called Party Address field 405, an SCCP—Calling Party Address field 410, a CAP—Called Party BCD Number field 415 and a CAP—Service Key field 420. The gsmSSF 155 places the SCF address stored in the OCSI data field gsmSCFAddress for that user into the SCCP—Called Party Address field 405, its own address into the SCCP—Calling Party Address field 410, the number dialed by the user (possibly including the dialed service code) into the CAP—Called Party BCD Number field 415, and the service key stored in the OCSI data field Service Key into the CAP—Service Key field 420; the number of the calling party, e.g. the MSISDN (Mobile Station International ISDN) is put in an additional CAP IDP message field (not shown in the drawings). The CAP IDP message travels over the signaling network, e.g. a SS7 (Signaling System 7) signaling network. The CAP IDP message may include further fields, not shown in the drawing, for example a field containing the IMSI International Mobile Subscriber Identity) of the caller.

In the conventional implementation of the CAMEL phase I, the CAP IDP message issued by the gsmSSF 155 would be received by the default SCF whose address is specified in the SCCP—Called Party Address field 405.

According to an embodiment of the present invention, the (CAP message interceptor 205 of the) IN service addressing function 160 intercepts the CAP IDP message issued by the gsmSSF 155 (block 330). The (CAP message parser 210 of the) IN service addressing function 160 parses the intercepted CAP IDP message (block 335); in particular, looking at the content of the CAP—Called Party BCD Number field 415 of the intercepted message, the (CAP message parser 210 of the) IN service addressing function 160 searches for the presence of any admissible service code (the list of the admissible service codes being available in the service codes database 215). If none of the admissible service codes is found (decision block 340, exit branch N) (for example because no service code has been dialed), the (CAP message interceptor 205 of the) IN service addressing function 160 may simply forward the CAP IDP as it is, to the default SCF (block 345); the CAP IDP message will thus be received by the default SCF, for example corresponding to the SCP 145-1, which will thus execute the requested service, as specified by the service key contained in the CAP—Service Key field 420 of the message, for example the pre-paid call service 150-1 (block 350) In case the number dialled by the user is found invalid by the SCF, the latter may reply issuing an error signalling, or it may instruct the visited network to handle the call according to the respective logic (it will be up to the visited network to issue an error signalling).

If, on the contrary, the (CAP message parser 210 of the) IN service addressing function 160 finds, in the CAP—Called Party BCD Number field 415 of the intercepted message one of the admissible service codes (exit branch Y of decision block 340), the (CAP message modifier 220 of the) IN service addressing function 160 modifies the intercepted message; in particular, the (CAP message modifier 220 of the) IN service addressing function 160 accesses the service codes database 210 using the service code located in the CAP—Called Party BCD Number field 415 of the intercepted message, and gets therefrom the address gsmSCFAddress of the SCF that corresponds to that service code (block 355); the retrieved SCF address (corresponding for example to the SCP 145-2) is used to replace the default SCF address in the SCCP—Called Party Address field 405 of the intercepted message (block 360); in a similar way, the (CAP message modifier 220 of the) IN service addressing function 160 gets from the service codes database 210 the service key that corresponds to the service code located in the CAP—Called Party BCD Number field 415 of the intercepted message (block 365), and replaces the default service key contained in the CAP—Service Key field 420 of the intercepted message with the new service key (block 370).

In a preferred embodiment of the invention, the (CAP message parser 210 of the) IN service addressing function 160, in order to verify whether the received service code is admissible, may additionally perform a check on the content of the SCCP—Called Party Address field 405. For example, different categories of subscribers may be created, each category having an associated SCF whose address is put in the OCSI data of the subscribers of that category. In the service codes database different service codes are associated to the different SCF addresses. The received service code is deemed to be valid provided that, in the service codes database, it is associated with the SCF address matching the gsmSCFAddress contained in the SCCP—Called Party Address field 405 of the received CAP IDP message.

The updated CAP IDP is then sent to the addressed SCF (block 375), in the example the SCF corresponding to the SCP 145-2, which will then execute the service identified by the service key contained in the CAP—Service Key field 420 of the modified CAP IDP message, for example the collect-call or the MVPN service 150-2 (block 380).

In this way, according to the described embodiment of the invention, the user is allowed to enjoy, for the current call, an IN service different from the default one. It is observed that the desired IN service may in some cases be implemented by the same default SCF specified in the gsmSCFAddress part of the OCSI data, but having a different service key than the default IN service.

It is observed that, in the described embodiment of the invention, the IN service addressing function 160 leaves the content of the SCCP—Calling Party Address field 410 of the intercepted CAP IDP message unaltered: in this way, the destination SCF, whose address is specified in the SCCP—Called Party Address field 405 of the modified CAP IDP message, can communicate directly with the gsmSSF 115, without the necessity of any further intervention by the IN service addressing function 160. Thus, it is possible to limit the intervention of the IN service addressing function 160 only to the first CAP IDP message related to a given call, whereas all the subsequent CAP messages relating to that call do not require the intervention of the IN service addressing function 160. This greatly reduces the processing load of the IN service addressing function 160.

In an alternative embodiment, however, the EN service addressing function 160 may be structured so as to intercept any CAP message relating to a certain service request, not only the initial message.

In the embodiment described in the foregoing, OCSI data in respect of a given user included the address of the default SCF, which is the SCF of the home network that, by default, is relied upon for providing IN services to the user when the latter roams in a different network. In alternative embodiment, the IN service addressing function 160 may be assigned a respective address by the operator of the home network, and such an address may be stored in the OCSI data for the users, instead of the address of the default SCF. In this way, when the gsmSSF of the visited network issues the CAP IDP message, the addressed network entity in the home network is the network entity that implements the IN service addressing function 160.

The present invention proposes a method which allows overcoming the strong limitations of the phase I of the CAMEL standard, allowing to address differentiated services controlled by different service logics, without having to wait for the expectedly long-to-come deployment of the phase 3 of the CAMEL standard.

Although the present invention has been disclosed and described by way of some embodiments, it is apparent to those skilled in the art that several modifications to the described embodiments, as well as other embodiments of the present invention are possible without departing from the scope thereof as defined in the appended claims.

The invention claimed is:

1. A method of making network services available to a subscriber of a first mobile communications network when the subscriber roams in a second mobile communications network, comprising:
    intercepting in the first mobile communications network a signaling message issued by a service switching function of the second mobile communications network as a consequence to a service request by the subscriber, the signaling message including service addressing data comprising an address of a service control function in the first mobile communications network, a service code, and a service key, the intercepting occurring before the signaling message reaches the service control function;
    parsing the signaling message, wherein said parsing comprises searching for the presence of an admissible service code by comparing the service code with a list of admissible service codes in a service codes database;
    if an admissible service code is not present, forwarding the signaling message; and
    if an admissible service code is present, modifying the signaling message by replacing the service addressing data with an address corresponding to the admissible service code, and replacing the service key with a service key corresponding to the admissible service code.

2. The method according to claim 1, wherein said signaling message comprises a customized application for mobile network enhanced logic application protocol initial data protocol signaling message issued by the second mobile communications network to the first mobile communications network.

3. The method according to claim 2, wherein said parsing the intercepted signaling message comprises checking a field of the customized application for mobile network enhanced logic application protocol initial data protocol signaling message adapted to carry a telephony number associated with said service request.

4. The method according to claim 1, wherein said network services comprise intelligent network services.

5. A mobile communications network comprising network apparatuses adapted to make network services available to a subscriber of the mobile communications network when the subscriber roams in a visited mobile communications network,
    wherein the network apparatuses in the mobile communications network comprise a service addressing function comprising:
    a signaling message interceptor adapted to intercept a signaling message issued by a service switching function of the visited mobile communications network as a consequence to a service request by the subscriber, the signaling message including service addressing data comprising an address of a service control function in the first mobile communications network, a service code, and a service key, the signaling message interceptor being arranged to intercept the signaling message before the signaling message reaches the service control function;
    a signaling message parser adapted to search for the presence of an admissible service code by comparing the service code with a list of admissible service codes in a service codes database; and
    a signaling message modifier adapted to modify, if the admissible service code is present, the intercepted signaling message by replacing the service addressing data with an address corresponding to the admissible service code, and replacing the service key with a service key corresponding to the admissible service code.

6. The mobile communications network according to claim 5, wherein said address corresponding to the admissible service code comprises a modified address of the service control function in the mobile communications network.

7. The mobile communications network according to claim 6, wherein said service key corresponding to the admissible service code comprises a modified service key identifying said service.

8. The mobile communications network according to claim 5, wherein said signaling message comprises a customized application for mobile network enhanced logic application protocol initial data protocol signaling message issued by the visited mobile communications network to the mobile communications network.

9. The mobile communications network according to claim 8, wherein said signaling message parser is adapted to check a field of the customized application for mobile network enhanced logic application protocol initial data protocol signaling message carrying a telephony number associated with said service request.

10. The mobile communications network according to claim 5, wherein said network services comprise intelligent network services.

11. An apparatus for use in a mobile communications network, comprising:
    a signaling message interceptor adapted to intercept a signaling message received by the mobile communications network, and issued from a service switching function of a visited mobile communications network in which a subscriber of the mobile communications network is roaming as a consequence to a service request by the subscriber, the signaling message including service addressing data comprising an address of a service control function in the first mobile communications network a service code, and a service key, the signaling message interceptor being arranged to intercept the signaling message before the signaling message reaches the service control function;
    a signaling message parser adapted to search for the presence of an admissible service code by comparing the service code with a list of admissible service codes in a service codes database; and a signaling message modifier adapted to modify, if the admissible service code is present, the intercepted signaling message by replacing the service addressing data with an address corresponding to the admissible service code, and replacing the service key with a service key corresponding to the admissible service code.

* * * * *